United States Patent
Mandrin et al.

[11] Patent Number: 6,164,458
[45] Date of Patent: Dec. 26, 2000

[54] METHOD FOR THE SEPARATION OF A FIRST LIQUID FROM A SECOND ONE

[75] Inventors: Charles Mandrin; Hans Ruckstuhl, both of Winterthur, Switzerland

[73] Assignee: Sulzer Chemtech AG, Wintherthur, Switzerland

[21] Appl. No.: 09/296,099

[22] Filed: Apr. 21, 1999

[30] Foreign Application Priority Data

Apr. 29, 1988 [EP] European Pat. Off. .............. 98810379

[51] Int. Cl.⁷ .................................................. B01D 17/02
[52] U.S. Cl. ..................................... 210/521; 210/DIG. 5
[58] Field of Search ..................................... 210/799, 800, 210/801, 802, 806, 807, DIG. 5, 532.1, 521

[56] References Cited

U.S. PATENT DOCUMENTS 5,401,404   3/1995   Strauss .............................. 210/DIG. 5
5,565,094  10/1996   Zoch et al. ........................ 210/DIG. 5

FOREIGN PATENT DOCUMENTS

0615776A1   9/1994   European Pat. Off. .
4103163A1   8/1992   Germany .
1485017     9/1977   United Kingdom .

OTHER PUBLICATIONS

Soviet Inventions Illustrated, Section Ch, Week 8148, Derwent Publications Ltd., London, GB; Class H01, AN 81–88622D XP002079987 & SU 808 096 B (Tartar Tatinpineft) Mar. 10, 1981, Abstract.

*Primary Examiner*—Robert Popovics
*Attorney, Agent, or Firm*—Townsend and Townsend and Crew LLP

[57] ABSTRACT

A method for separating a first liquid from a second liquid, with the one liquid not being soluble in the other, the first liquid being contained as droplets in the second one, and with the two liquids having different densities. In a first step the liquid mixture is conducted during a first time interval as a turbulent flow through installations, in particular through a filler body in a packing column or through a static mixer, for coalescing the droplets. In a second step the flow rate of the mixture is reduced during a second time interval to continue the coalescence, and, in a third step, the speed of the mixture flow is further reduced and directed opposite to or with the force of gravity so that larger descending or rising droplets can be collected and separated out. The smaller droplets are carried along further by the second liquid.

5 Claims, 4 Drawing Sheets

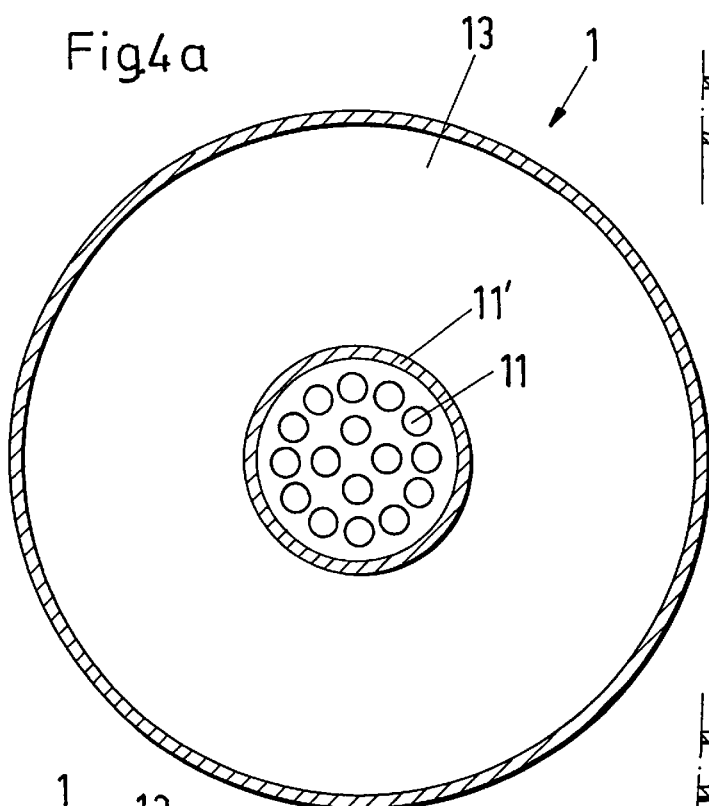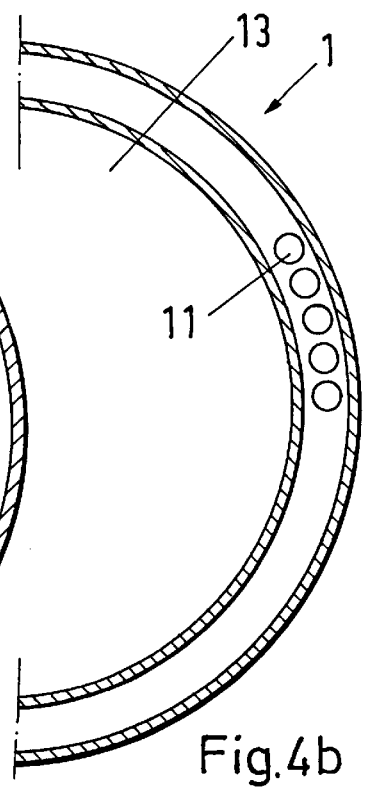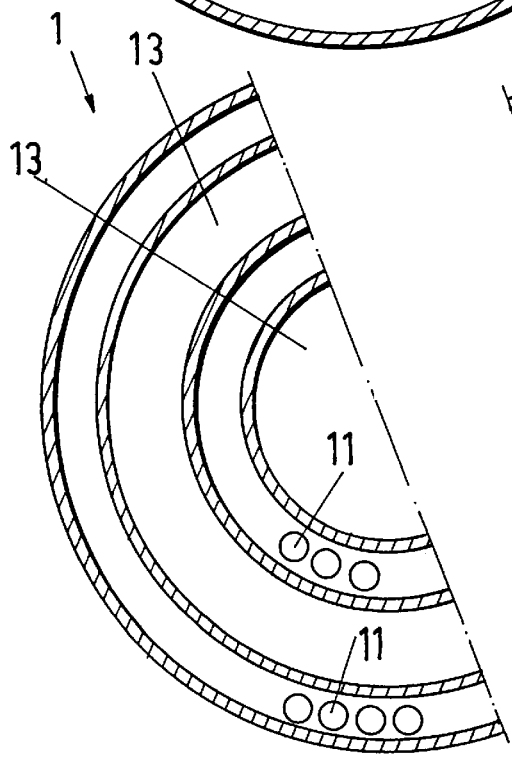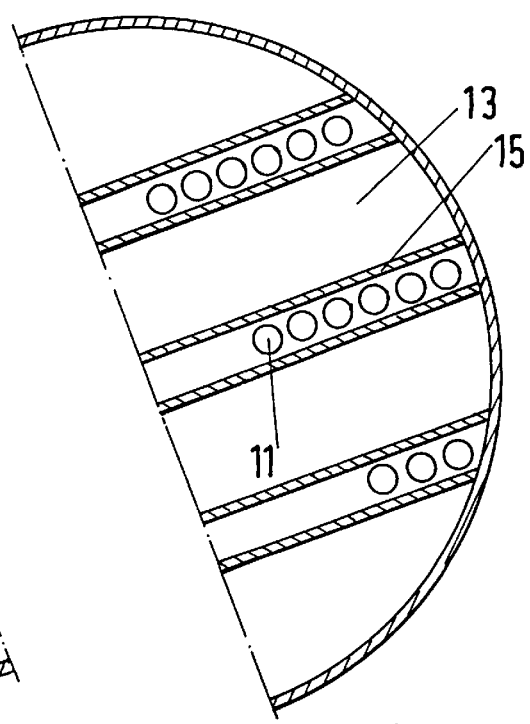

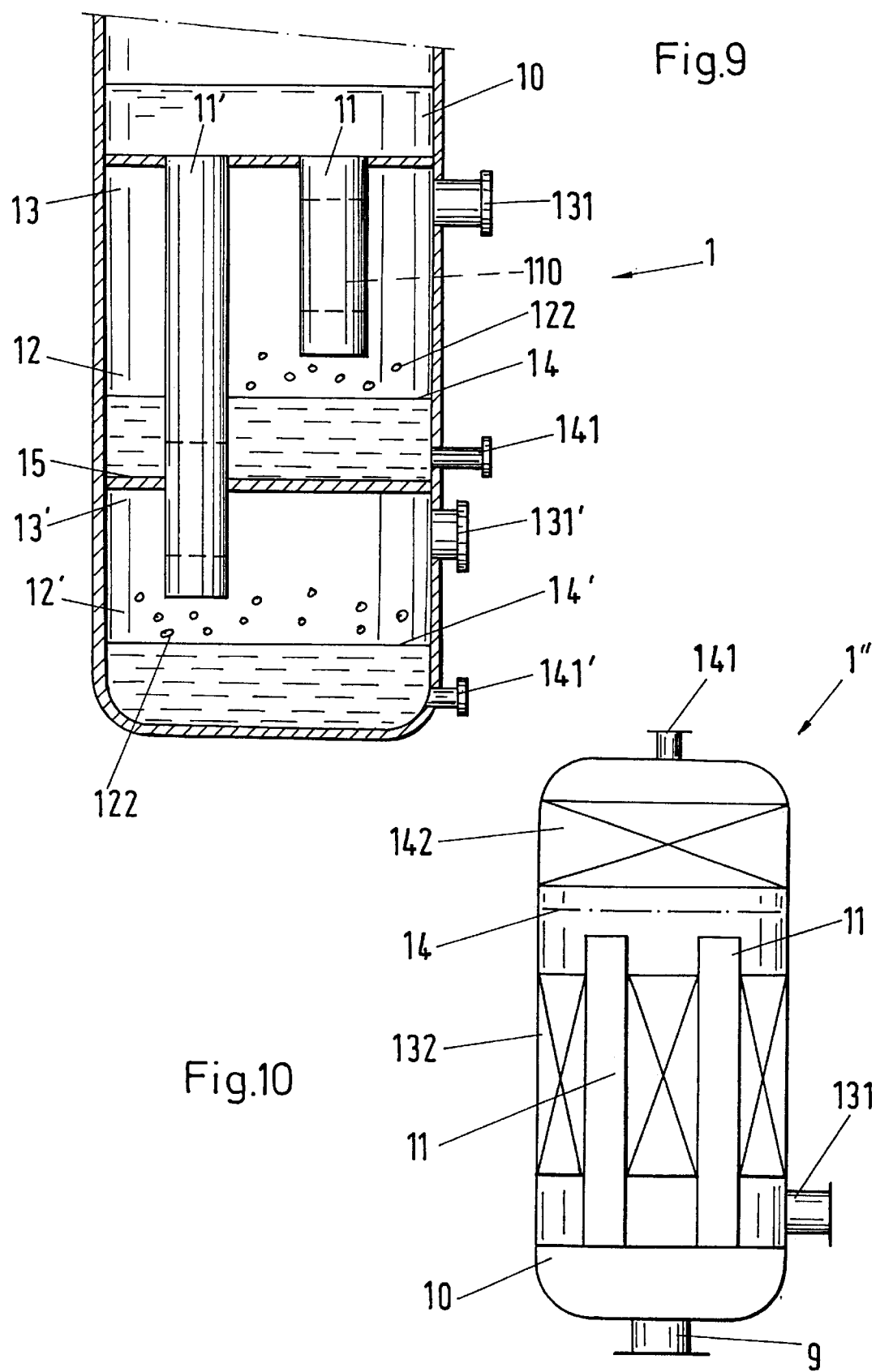

METHOD FOR THE SEPARATION OF A FIRST LIQUID FROM A SECOND ONE

BACKGROUND OF THE INVENTION

The invention relates to a method for the separation of a first liquid from a second one, in particular for the separation of water droplets from oil or, conversely, of oil droplets from water.

Oil from mineral sources, namely petroleum or so-called condensate, as a rule contains water as a result of geological processes, of sea water intrusions into oil and/or gas fields, or of injected pressurized water which has been introduced during the extracting of the oil for the maintaining of the pressure in the oil field. Condensate is a liquid consisting of heavy hydrocarbons which arise as accompanying substances in the winning of the natural gas and which are separated from the gas. In the following the terms oil and petroleum shall also comprise the condensate.

Water can be tolerated only in small amounts in oil which is supplied to refineries as a raw material due to corrosion in transport ships or forwarding pipes, due to transport costs for valueless water and due to fractionating processes in the refineries, which can mostly be carried out only in the absence of water. As a rule an oil which is transported by tankers must not contain more than 1% water.

In a known apparatus ("operformax coalescer"), which is formed as a cylindrical and horizontally arranged container, phases of a mixture which consists of the three phases gas, oil and water in the form of very fine droplets are separated. The water droplets, the average diameter of which lies in the range from about 10 to 30$\mu$m, arise in a pressure relaxation in a high pressure valve ("schoke valve"), with it being possible for the pressure drop to amount to a multiple of 100 bar. The values of the droplet diameters scatter strongly about the mean value.

The gas and oil/water mixture flow—in the upper part of the apparatus, or in its lower part respectively—from an intake region to an outlet region. Water and oil separate in this situation thanks to a difference in density; at the outlet region they form a layer of oil which contains only 0.5 to 1% water and a layer of water lying below it which is contaminated by oil. The water must then be treated (e.g. with centrifugal separators) in order to obtain a quality which is tolerable by the environment.

In the inlet region of the three-phase separation apparatus a packing can be installed for the following purposes: If the site of the apparatus during use is, for example, a ship or a floating platform ("offshore sites") then a re-mixing of the three phases as a result of the rolling movement should be prevented; in addition the coalescence of the water droplets should be encouraged. Whereas the first of these goals is attained without doubt, the second appears questionable since most of the droplets do not enter into contact with the surface when flowing through the packing, and thus a coalescence-encouraging effect can be only weakly developed.

This three-phase separation apparatus has a very large volume, which is particularly disadvantageous for offshore sites. Dwell times of from 3 to 10 minutes are required for the oil. The speeds of the phases flowing through the apparatus are on the order of magnitude of several millimeters per second.

Water/oil filters are known in which a coalescence is based on a filtering effect and not on a flow or gravitational effect. These filters can be used only for low water proportions in the range of 1% to 10 ppm water since at higher water proportions the filters become saturated with water and thus become ineffective.

In addition to a separation of water from oil, a separation of oil from water, as is required for example in sea water pollutions after tanker accidents, should also be possible with the separation apparatus.

SUMMARY OF THE INVENTION

It is therefore an object of the invention to provide a method which permits the separation of two liquids, one of which is contained in the other in droplet form, in as small an apparatus as possible and/or with dwell times in the apparatus which are as short as possible.

The method in accordance with the invention serves for the separation of a first liquid from a second one, with the one liquid not being soluble in the other, with the first liquid being contained as droplets in the second one, and with the two liquids having different densities. The method comprises the following three steps:

1. For the production of a coalescence of the droplets the liquid mixture is conducted during a first time interval as a turbulent flow through installations—in particular through a filler which can be used in packing columns or through a static mixer.
2. The flow is held at a reduced speed during a second time interval for a further development of the coalescence.
3. Finally the flow is conducted at a further reduced speed opposite to or with the force of gravity respectively, with larger descending or rising drops respectively being collected and separated out, whereas smaller droplets are carried along further by the second liquid.

The dwell time of the oil in the separation apparatus is significantly reduced in the method in accordance with the invention with respect to the previously known method, and indeed thanks to the fact that an enlargement of the droplets is carried out in three steps, with a suitable choice for the flow speed in each case being made for each step. Turbulence is provided for in the first step using installations and a relatively high flow speed, so that all droplets are subject to a state of movement which—as can be proven experimentally—brings about the merging of smaller droplets with larger ones, and which hence encourages the coalescence. In the second step the two-phase flow is calmed, with the coalescence continuing. Finally, in the third step the separation of the phases is carried out as a result of the density differences, with large particles depositing, but with small ones however remaining suspended in the second liquid. The depositing of the water droplets in the last step can be improved by means of a packing. The method in accordance with the invention yields a better purity of the oil (in the tests carried out, 0.05% water instead of 0.5 to 1%). The separation is not done, as in the previously known separation apparatus, in a coexistence of the liquid mixture with a gas phase, so that the separation is largely independent of a possible roll motion of the site.

Further experiments with the method in accordance with the invention yielded particularly good results: 0.1 to 0.2% water in the oil, 20 ppm oil in the drain water. (Since the oil proportion must not exceed 40 ppm in a disposal of water into the sea, a subsequent cleansing of the water is, in view of these experimental results, no longer required.)

It is known to disperse a first liquid in a second liquid by means of static mixers so that a liquid mixture results in which the one liquid is suspended in the other liquid in the form of droplets (see e.g. F. Streiff "Anwendung statischer Mischer being In-line-Dispergieren", MM Maschinenmarkt, 1977, p. 289). In the method in accordance with the invention it is a matter of a reversal of a dispersing method of this kind, with it partially being possible to use similar means, namely installations which have the structure of static mixers. When studying the dispersion methods carried out with static mixers, one finds that the diameter of the droplets produced cannot be made as small as desired, but that a stationary state sets in which no longer changes in flowing through further static mixers. A stationary state of this kind depends on the mixer structure and on the flow speed. It is to be conjectured that in the stationary state a production of new droplets is in equilibrium with a merging of existing droplets.

The basic idea of the invention is now to attempt a displacement of an equilibrium of this kind in which the merging processes dominate through a suitable change of the operating conditions. Consequently, for a liquid mixture which contains small droplets, it should be possible to obtain a reversal of the dispersal effect in a suitable treatment in a static mixer which leads to an enlargement of the average droplet diameter. Experiments have confirmed this conjecture and thus shown that a coalescence-encouraging measure actually is given with the first step of the method in accordance with the invention.

The turbulence of the first method step should be formed in such a manner that as small a number of large droplets as possible break up and as many small droplets as possible merge with one another. The turbulence need only have the effect that a sufficiently strongly developed circulation of the liquid is present at each point of the interior of the installation, so that a separation of the phases as a result of the density differences is prevented.

For the development of the turbulence other installations can be used which are not provided for a static mixing, for example filler bodies which can be used in packing columns. A so-called turbulence packing which is well suited to carrying out the first method step is known from EP-B 0 418 338.

BRIEF DESCRIPTION OF THE DRAWINGS

FIGS. 4a–4c and 5 are schematica illustrated cross-sections through apparatuses in accordance with the invention, FIG. 9 is a variant of the apparatus of FIG. 1 and FIG. 10 shows an apparatus for removing oil from water.

DESCRIPTION OF THE PREFERRED EMBODIMENTS

Figure 1:
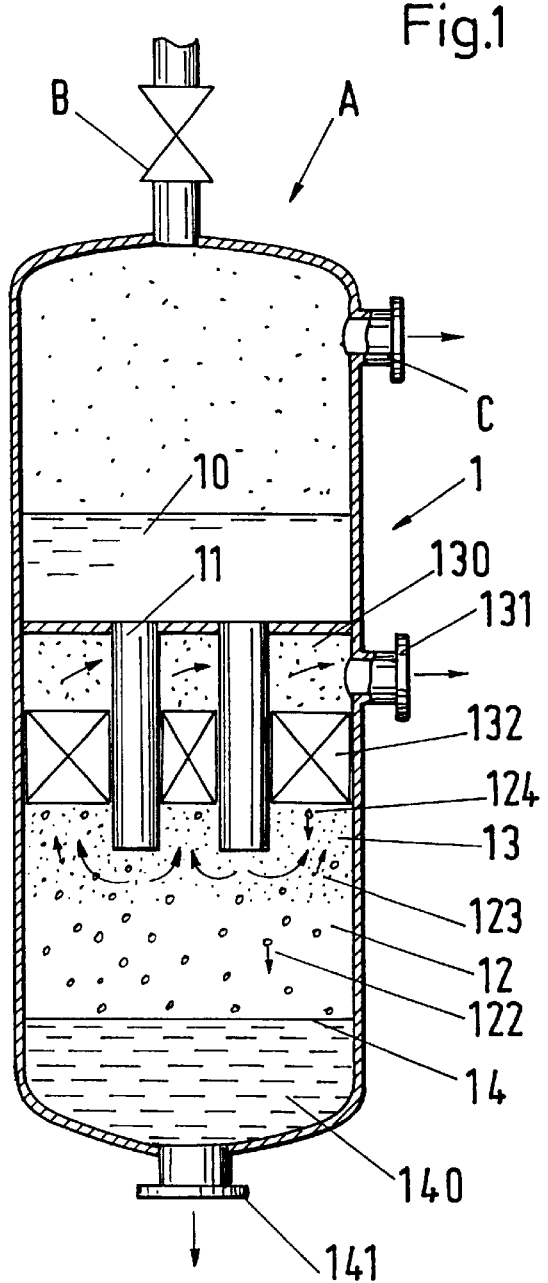
FIG. 1 shows a three-phase separation apparatus in which the method in accordance with the invention can be carried out.

A three-phase separation apparatus A is illustrated in FIG. 1 and comprises an apparatus 1 in accordance with the invention for the separation of a liquid two-phase mixture 10, in particular for the separation of water droplets from oil. A three-phase mixture, which contains a gas phase in addition to the two liquid phases, is fed through a valve B into the apparatus A, the gas is separated in the latter from the two-phase mixture 10, and the gas is removed from the apparatus A via the connector C. A first liquid is contained in the form of droplets in a second liquid in the two-phase mixture 10, with the first liquid (water) having a greater density than the second (oil) in the illustrated example.

The mixture 10 is largely separated into the two liquids in the apparatus 1 of the method in accordance with the invention: A first step of the method takes place in members 11 which contain installations 110, for example static mixers in accordance with FIG. 2. A coalescence results from a turbulence in the installations 110 in which larger droplets grow through the capture of smaller droplets. The average speed of the turbulent flow has a value between 100 and 1000 mm/s. In a space 12 lying beneath the members 11 the coalescence continues (second step). The flow speed is reduced (50 to 500 mm/s) so that the larger droplets 122 can deposit. In the sump of the apparatus 1 they form a phase 140 consisting mainly of the first liquid with a boundary surface 14 which has fractal properties: The boundary surface 14 is formed by an emulsion-like transition zone in which the droplets 122 gradually merge to the continuous phase 140. The first liquid of the phase 140 can be let off out of the apparatus A via the connector 141. The second liquid, which has a lower density, moves upwardly out of the space 12, with the smallest droplets 123 of the heavy liquid being carried along. In the space 13 lying above it the second liquid flows relatively slowly (10 to 100 mm/s; third step) so that yet further droplets 122 are also deposited. The depositing of the first $H_2O$ can be encouraged or accelerated with installations 132 in that droplets which are carried along by the second liquid additionally remain adherent at surfaces of the installations 132 and form downwardly running films which are finally released from the installations 132 as larger droplets 124. The second liquid, which is largely freed from the first one, can be removed from the apparatus A via a connector 131.

Figure 2:
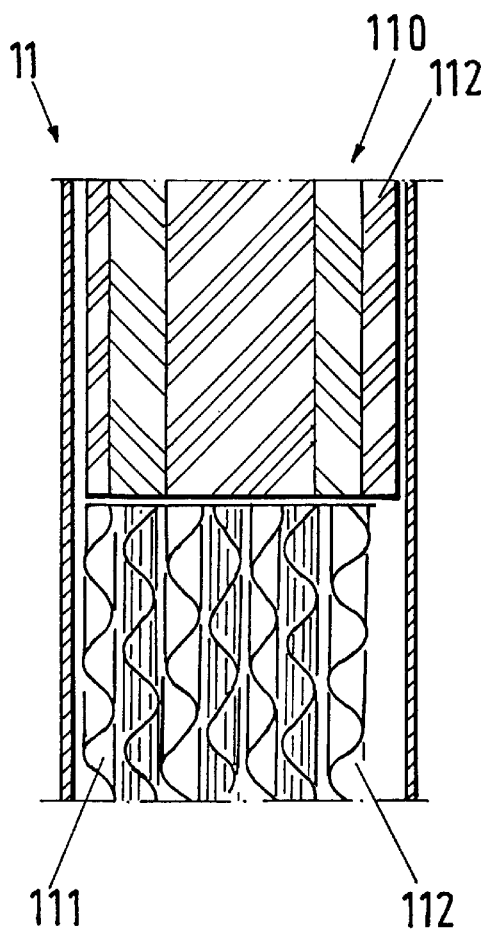
FIG. 2 shows installations for carrying out a static mixing.
Figure 3:
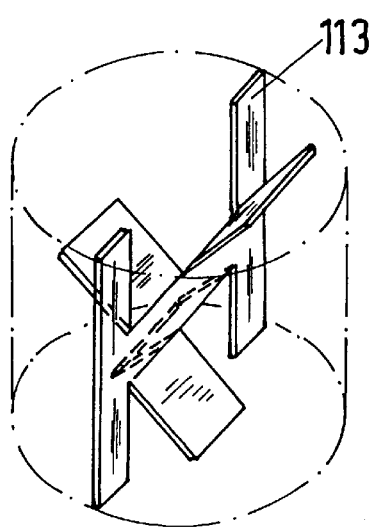
FIG. 3 shows an element for a further example of installations.

The member 11 which is sectionally illustrated in FIG. 2 is cylindrical and contains a static mixer 110. The latter is built up of corrugated layers 111 which are arranged in parallel and has a cross channel structure, i.e. it forms an ordered structure or packing with channels which openly cross one another. The mixer is assembled from a plurality of units 112, with adjacent units being oriented transverse to one another with respect to their layers. A cross channel structure can also be provided for the installations 132 of the third method step. Many structures can be used for the installations 110 of the member 11. An alternative structure element 113—likewise for a member 11 with a circular cross-section—is shown in FIG. 3. The corresponding installation structure is assembled from a linear arrangement of structure elements 113 of this kind.

The first method step can also comprise at least two partial steps, so that in each case the Weber number (We) of the flow decreases from one of these partial steps to the following one as a result of the changes of the hydraulic diameter and/or of the geometry of the installations. In this the average diameter of the coalescing droplets increases thanks to a reduction of the turbulence. (For this cf. the above cited publication of Streiff, relations (5), (8) and FIG. 4, from which it can be seen that: the lower the Weber number We, the larger the droplets. $-We=\rho w^2 d_h \sigma^{-1}$=the product of the density, the square of the flow speed, the hydraulic diameter of the installations and the reciprocal value of the boundary surface tension.)

In the carrying out of the method in accordance with the invention in an experimental setup a mixture of water (first liquid) and paracryol (second liquid) was separated. In a disperser, water droplets were produced, of which the average diameter lay in the range between 10 and 30 $\mu$m. After carrying out the first step, water droplets formed in the second step, the diameters of which were greater than 3 mm. The paracryol still contained approximately 0.05% water after the removal of the water droplets. The dwell time of the paracryol in the test setup amounted to about 60 seconds, that is, about 3 to 10 times less than in known separation apparatuses. 2 to 3 m$^3$/h of liquid were treated with the experimental apparatus. FIGS. 4a to 4c and FIG. 5 show cross-sections through apparatuses 1 which are provided for the treatment of larger amounts (1000 to 1200 m$^3$/h) of two-phase liquid. In FIG. 4a the members 11 form a bundle of a plurality of static mixers which in each case have a cylindrical cross-section. A partition wall 11' encloses this arrangement in the middle of a circular-ring-shaped space 13, in which the third step of the method in accordance with the invention takes place. The members 11 can also be arranged—see FIG. 4b—in a ring space or—see FIG. 4c—in a plurality of ring spaces. In the apparatus 1 of FIG. 5 the members 11 are arranged in shafts 15 with rectangular cross-section.

Figure 7:
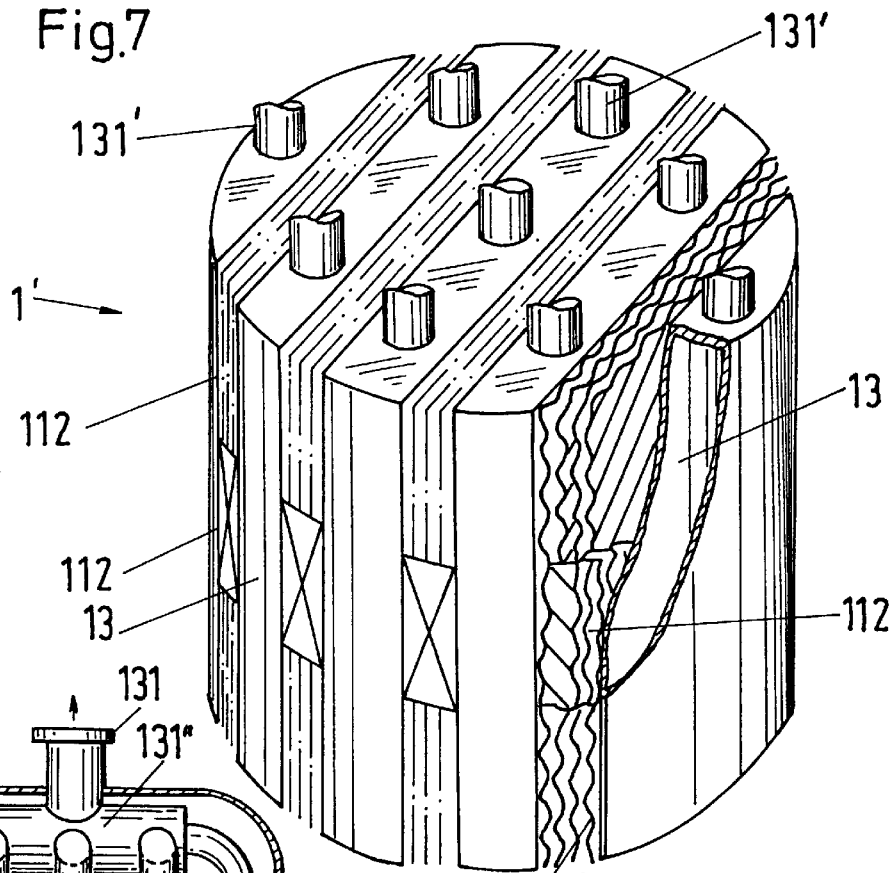
FIG. 7 shows an insert for the apparatus of FIG. 6.
Figure 6:
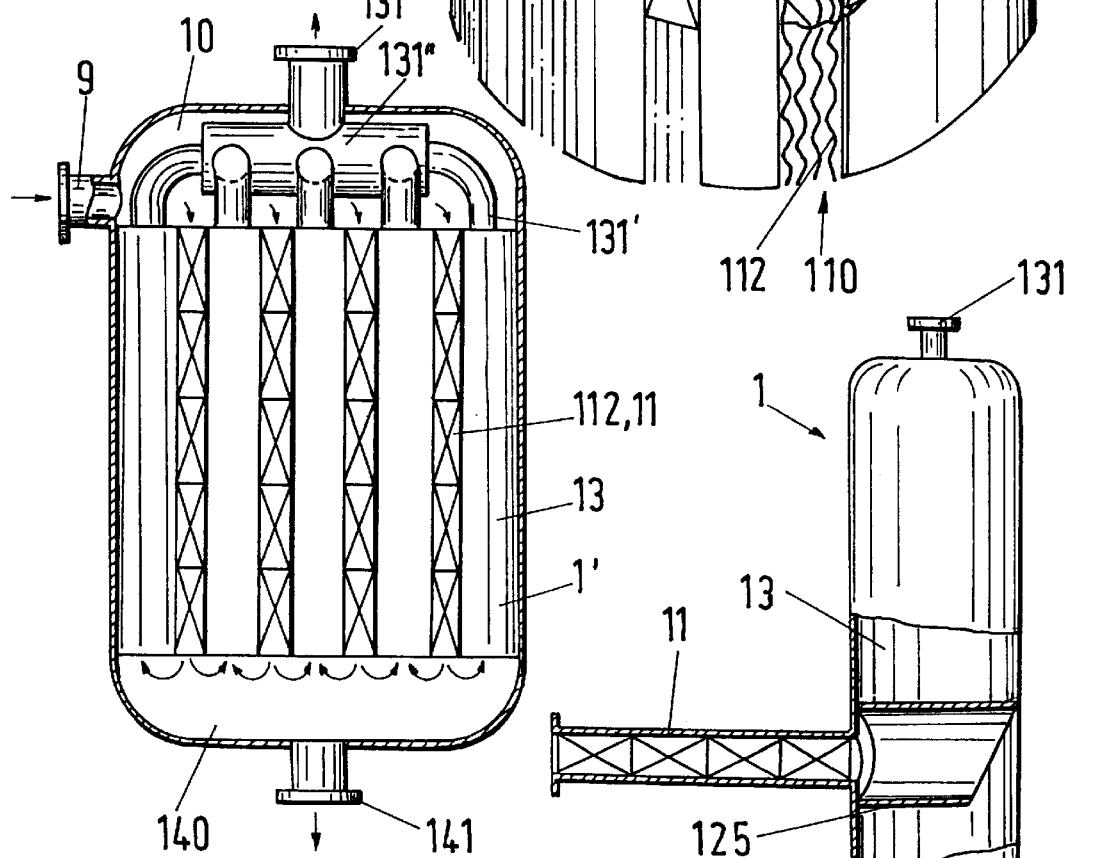
FIG. 6 is a longitudinal section through an apparatus in accordance with the invention.

Shafts with rectangular cross-section are—as is shown in FIGS. 6 and 7—advantageously filled with installations which extend over the entire cross-section.

The apparatus 1 of FIG. 6 contains the insert 1' illustrated in FIG. 7. The latter is built up layer-wise and alternatingly of static mixers 110 (cross channel structure) and cavities 13 which are downwardly open. The spaces 13 can contain packings 132 (cf. FIG. 1). At their open ends the second liquid can be removed after the treatment with the method in accordance with the invention via tubes 131' and conveyed to the outlet connector 131 via a common tube 131". Instead of installations with the cross channel structure, the above named turbulence packing can also be used quite well.

In the apparatus 1 of FIG. 6 the mixture to be treated is conducted in via the side connectors 9 and the product liquid which has been freed from the droplets is removed through the upper connector 131. It can be more advantageous if the mixture to be treated can be conducted in above and the product liquid removed at the side. This is possible if in the insert 1' of FIG. 7 the static mixer structures 110 which are provided for the first method step are exchanged with the packings in the cavities 13 for the third method step.

Figure 8:
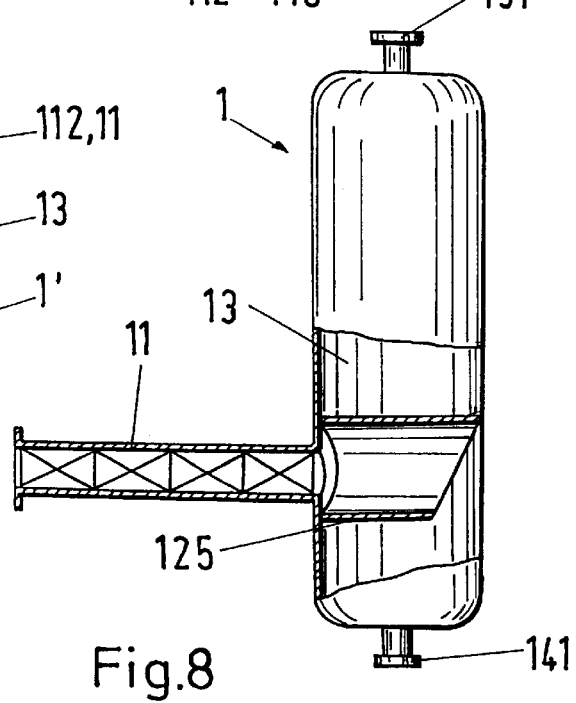
FIG. 8 shows a further exemplary embodiment of the apparatus in accordance with the invention.

An apparatus 1 is shown in FIG. 8 in which the member 11 for the first method step is oriented horizontally. The third step is carried out in the vertical container 13. The coalescence of the second step takes place in a tube piece 125 which is arranged horizontally as an extension of the member 11 in the container 13. The partial space bounded off by the tube piece 125 has a downwardly enlarging opening at its outlet which leads into the interior of the container 13. The tube piece 125 can also be dispensed with since the method step 2 would also take place in the named partial space without the latter. The container 13 can again contain installations.

A largely oil-free water is obtained with the method of the invention. The purity of the water depends on the relationships in the sump 140 of the apparatus 1 (see FIG. 1), in particular on the following parameters: the quantity of droplets depositing per unit time on the fractal boundary surface 14 and the dwell time of the water in the sump 140. The purity can be further improved by means of installations in the sump 140.

The fractal boundary surface 14 is substantially a layer-shaped zone, the thickness of which likewise increases as the rate of the depositing droplets increases. The purity of the water separated off depends on the thickness of this zone. For a high purity the zone must be as thin as possible. This can be achieved with an apparatus such as is shown in FIG. 9.

The apparatus 1 in FIG. 9 is a modification of that in FIG. 1, with now a first part of the mixture 10 being led through one of the static mixers 11 into a first chamber 12, 13 and a second part through the other mixer 11' into a second chamber 12', 13' arranged beneath it. A wall 15 separates the two chambers. In these chambers the second and the third method steps take place respectively. Since the total area of the fractal boundary surfaces 14 and 14' is now doubled with respect to that in FIG. 1, a better purity is to be expected for the water which flows off via the connectors 141 and 141' if equal amounts are treated in both cases. The oil, which can likewise have a somewhat better quality, leaves the apparatus 1 via the two connectors 131 and 131'. Obviously more than two chambers 12, 13 and 12', 13' respectively can be provided in order to further increase the fractal boundary surfaces 14, 14'.

The method in accordance with the invention can also be used in a cleansing of sea water which has been contaminated by a tanker accident. In this case oil droplets (first liquid) are contained in water (second liquid). Accordingly, an apparatus for the separation of the two liquids must be reversed with respect to the apparatus described above. FIG. 10 shows a schematically illustrated apparatus 1" of this kind: an inlet connector 9 for contaminated water (mixture 10) below, a removal connector 141 for separated off oil above, and a removal connector 131 for purified water at the side. The treatment of the mixture is again done in static mixers 11 (with mixer structures 110) and further installations 132, which advantageously have the shape of packings with a cross channel structure. Further installations for the separation of water droplets which are carried along out of the floating oil are provided above the boundary surface 14, which is indicated in chain dotted lines and which again has fractal properties here (oil droplets suspended in water and water droplets suspended in oil).

In the ideal case the water can be purified to within 40 ppm. In the case of larger accidents however it is preferable to treat large amounts of water rapidly and with corresponding losses with respect to the purity.

What is claimed is:

1. Apparatus for the separation of a liquid mixture formed by first and second liquids, the liquids not being soluble in each other, the first liquid being contained as droplets in the second liquid, and the liquids having different densities, the liquid mixture being conducted in a first step during a first time interval as a turbulent flow through a mixing installation, in a second step the flow speed of the liquid mixture during a second time interval being reduced for a further development of the coalescence, thereafter in a third step the flow speed of the mixture being further reduced and the mixture flowing in a direction opposite to or with the force of gravity, larger descending or rising drops being collected and separated out, and smaller droplets being carried by the second liquid, the apparatus comprising a vertical container having a wall and forming a chamber for the collection of the liquid mixture, a vertical tube containing a static mixer for carrying out the first step, a collection space for the second liquid between the container wall and the vertical tube for carrying out the third step, and a further region in the container into which the vertical tube opens and which has a cross-section that is larger than a cross-section of the tube to effect a reduction in the speed of the mixture flow in its transition from the first to the second step.

2. Apparatus in accordance with claim 1 wherein the tube defines a shaft having a rectangular cross-section and wherein the collection space is assembled from chambers which are arranged in parallel and which each have a rectangular cross-section.

3. Apparatus in accordance with claim 2 including packings with an ordered structure arranged in the shaft and the chambers.

4. Apparatus in accordance with claim 1 including at least two zones which are connected in series for performing the first step; and wherein in each case the Weber number of a fluid which flows through decreases from one of the zones to the following zone as a result of changes of at least one of the hydraulic diameter and the geometry of the installation so that an average diameter of the coalescing drops increases due to a decrease in the turbulence in the direction of flow.

5. Apparatus in accordance with claim 1 including first and second chambers separated by a wall for carrying out the second and third method steps; and in that the one of the chambers is arranged above the other chamber.

* * * * *